(12) United States Patent
Zhu et al.

(10) Patent No.: US 11,966,598 B2
(45) Date of Patent: Apr. 23, 2024

(54) METHOD, DEVICE, AND PROGRAM PRODUCT FOR MANAGING INDEX OF STORAGE SYSTEM

(71) Applicant: EMC IP Holding Company LLC, Hopkinton, MA (US)

(72) Inventors: Julius Jian Zhu, Shanghai (CN); Lu Lei, Shanghai (CN); Pengfei Su, Shanghai (CN); Jingjing Liu, Shanghai (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 221 days.

(21) Appl. No.: 17/246,315

(22) Filed: Apr. 30, 2021

(65) Prior Publication Data
US 2022/0236896 A1    Jul. 28, 2022

(30) Foreign Application Priority Data

Jan. 27, 2021   (CN) .......................... 202110109082.3

(51) Int. Cl.
*G06F 3/00* (2006.01)
*G06F 3/06* (2006.01)
(52) U.S. Cl.
CPC .......... *G06F 3/0629* (2013.01); *G06F 3/0604* (2013.01); *G06F 3/0644* (2013.01); *G06F 3/0673* (2013.01)

(58) Field of Classification Search
None
See application file for complete search history.

(56) References Cited

U.S. PATENT DOCUMENTS

| 2014/0201195 A1* | 7/2014 | Kirazci | G06F 16/31 |
| | | | 707/722 |
| 2022/0237188 A1* | 7/2022 | Su | G06F 16/2228 |

\* cited by examiner

*Primary Examiner* — Midys Rojas
(74) *Attorney, Agent, or Firm* — Amin, Turocy & Watson, LLP (57) ABSTRACT

Indices of storage systems are managed. An example method includes: receiving a flush cycle for flushing expired events in a storage system including multiple events in a data stream, determining, based on the flush cycle, a time slice for managing the index of the storage system, creating a slice index node for the time slice in response to determining that the occurrence time of a first event that enters the storage system in the data stream is within the time slice, wherein the slice index node includes an index node of the first event, and adding the slice index node to the index. A corresponding device and a corresponding computer program product are provided. Thus, the index of a large number of events entering the storage system is managed according to the occurrence time of the events, and the storage system can be searched and updated accurately and effectively.

20 Claims, 8 Drawing Sheets

METHOD, DEVICE, AND PROGRAM PRODUCT FOR MANAGING INDEX OF STORAGE SYSTEM

RELATED APPLICATION

The present application claims the benefit of priority to Chinese Patent Application No. 202110109082.3, filed on Jan. 27, 2021, which application is hereby incorporated into the present application by reference herein in its entirety.

TECHNICAL FIELD

Implementations of the present disclosure relate to storage systems, and more particularly, to a method, a device, and a computer program product for managing an index of a storage system.

BACKGROUND

With the development of data storage technologies, various data storage devices have been able to provide users with increasingly high data storage capabilities, and the data access speed has also been greatly improved. For a storage system for streaming data, a large number of events in the data stream are continuously stored to the storage system. At present, technical solutions for creating an index for events have been proposed. However, the performance of the existing technical solutions is not satisfactory. At this moment, how to create and manage an index of a storage system with higher performance, and thus improve the performance of the entire storage system becomes a technical problem.

SUMMARY

The following presents a simplified summary of the disclosed subject matter in order to provide a basic understanding of some aspects of the disclosed subject matter. This summary is not an extensive overview of the disclosed subject matter. It is intended to neither identify key or critical elements of the disclosed subject matter nor delineate the scope of the disclosed subject matter. Its sole purpose is to present some concepts of the disclosed subject matter in a simplified form as a prelude to the more detailed description that is presented later.

Therefore, it is desirable to develop and implement a technical solution for managing an index of a storage system in a more effective manner. It is expected that this technical solution can manage an index of a storage system in a more convenient and effective manner. Furthermore, it is expected that the created index can be used to improve the access and update efficiency of the storage system.

According to a first aspect of the present disclosure, a method for managing an index of a storage system is provided. In this method, a flush cycle for flushing expired events in the storage system is received, wherein the storage system includes multiple events in a data stream. A time slice for managing the index of the storage system is determined based on the flush cycle. A slice index node is created for the time slice in response to determining that the occurrence time of a first event that enters the storage system in the data stream is within the time slice, wherein the slice index node includes an index node of the first event in the storage system. The slice index node is added to the index of the storage system.

According to a second aspect of the present disclosure, an electronic device is provided, including: at least one processor; a volatile memory; and a memory coupled to the at least one processor, the memory having instructions stored therein, wherein the instructions, when executed by the at least one processor, cause the device to execute the method according to the first aspect of the present disclosure.

According to a third aspect of the present disclosure, a computer program product is provided, which is tangibly stored on a non-transitory computer-readable medium and includes machine-executable instructions, wherein the machine-executable instructions are used to perform the method according to the first aspect of the present disclosure.

BRIEF DESCRIPTION OF THE DRAWINGS

In combination with the accompanying drawings and with reference to the following detailed description, the features, advantages, and other aspects of the implementations of the present disclosure will become more apparent, and several implementations of the present disclosure are illustrated here by way of example rather than limitation. In the accompanying drawings, FIG. 1 schematically illustrates a block diagram of a storage system according to a technical solution.

DETAILED DESCRIPTION

Hereinafter, example implementations of the present disclosure will be described in more detail with reference to the accompanying drawings. Although the example implementations of the present disclosure are shown in the accompanying drawings, it should be understood that the present disclosure may be implemented in various forms and should not be limited by the implementations set forth herein. Rather, these implementations are provided so that the present disclosure will be more thorough and complete, and the scope of the present disclosure will be fully conveyed to those skilled in the art.

The term "include" and variants thereof used herein indicate open-ended inclusion, that is, "including but not limited to." Unless specifically stated, the term "or" means "and/or". The term "based on" means "based at least in part on." The terms "one example implementation" and "one implementation" mean "at least one example implementation." The term "another implementation" means "at least one further implementation." The terms "first," "second," and the like may refer to different or identical objects. Other explicit and implicit definitions may also be included below.

In the context of the present disclosure, events in a data stream may relate to a variety of types, and the various events may occur at different times. For example, in an application environment where the operational status of a data center is monitored, the data stream may include log data of various devices in the data center. In this case, the events in the data stream may be log data generated at various time points (e.g., every minute, or another time interval). For another example, in an application environment where road traffic conditions are monitored, the data stream may include images, videos, and/or other data collected by multiple collecting devices at multiple locations.

Figure 1:
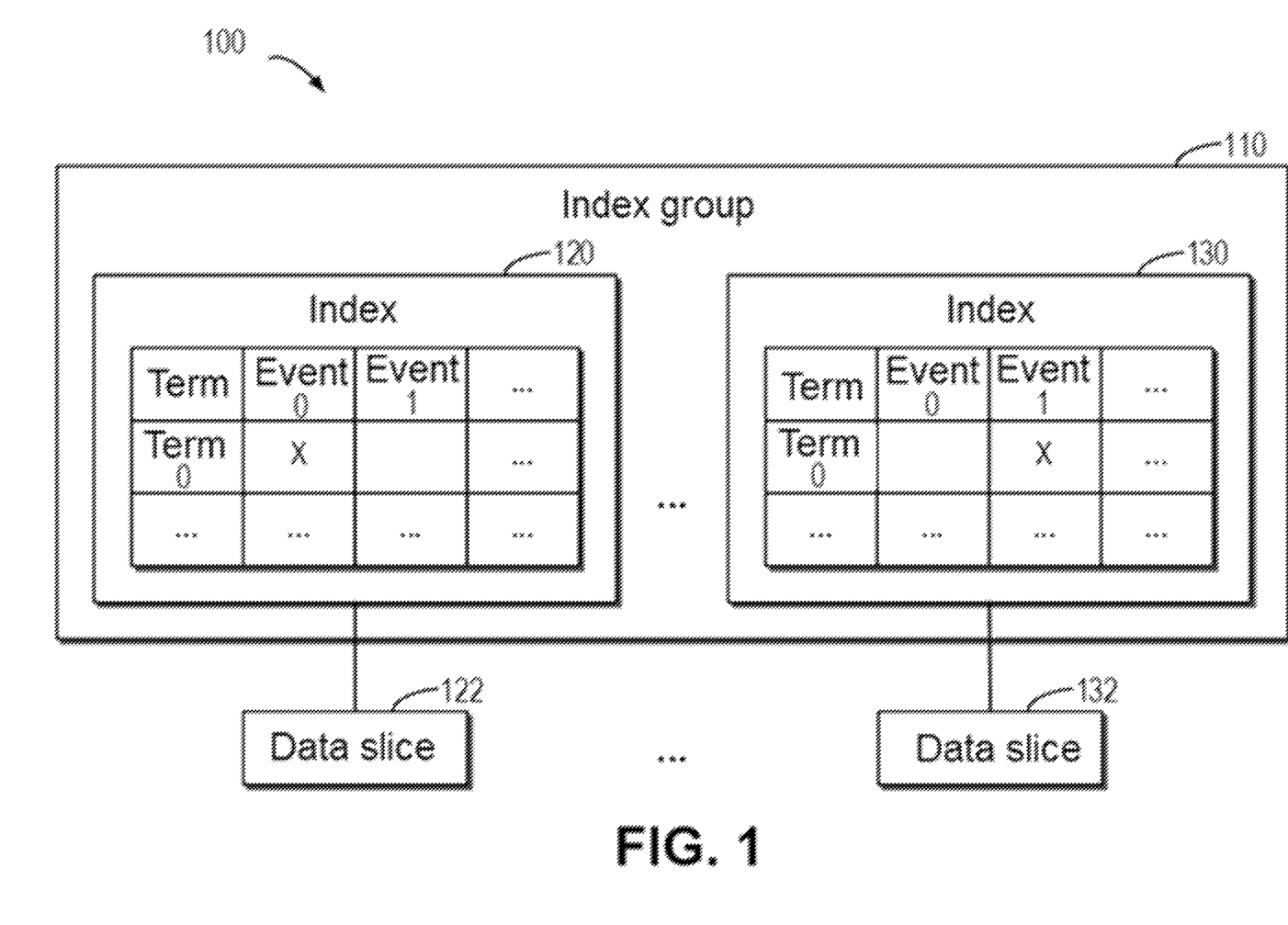

It will be understood that the data stream is continuous and can involve huge amounts of data. To facilitate storage, a large number of events can be divided into multiple slices based on hash algorithms, etc., and the multiple slices can be stored in different storage devices. For ease of description, an overview of a storage system will first be described with reference to FIG. 1. FIG. 1 schematically illustrates a block diagram of storage system 100 according to a technical solution. As shown in FIG. 1, storage system 100 may include data slices 122, . . . , 132, and so on. A threshold capacity of a data slice can be specified in advance, and when the amount of data in the data slice reaches that threshold capacity, a new data slice is created. At present, technical solutions have been proposed for creating indexes for separate data slices. For example, index 120 can be created for data slice 122, . . . , and index 130 can be created for data slice 132. In this case, the index of storage system 100 includes index group 110, and index group 110 includes indexes 120, . . . , and 130 of various data slices. Further, storage system 100 can be managed based on index group 110.

However, a user of storage system 100 needs to develop a specialized application to manage index group 110. When a searching request is received, one or more indexes corresponding to the searching request can be found in index group 110 based on a hash algorithm, and then the one or more searching results can be returned. Further, the one or more searching results returned can be filtered to serve as the final searching result.

It will be understood that in the process of managing index group 110, failures and/or misoperations may occur, resulting in errors in the index group. Thus, the existing index management solutions cannot manage the index of the storage system effectively. Further, there is a validity period for events in the storage system, and when some events in the storage system has expired, these expired events will be flushed from the storage system. It is then necessary to traverse the indexes in index group 110 one by one to find the expired events. Thus, index group 110 based on existing technical solutions cannot provide satisfactory performance.

In order to overcome the above defects, the implementations of the present disclosure provide a technical solution for managing an index of a storage system. Specifically, the index can be created based on a flush cycle for flushing expired events in the storage system and in accordance with the occurrence time of multiple events in a data stream. Assuming that the flush cycle is 1 day, the index can be created in a time unit of 1 day. That is, separate index nodes are created for events that occur within each day.

With the example implementations of the present disclosure, it is possible to create indexes for a large number of events within the storage system in accordance with the flush cycle and in a chronological order. In this manner, the index can be managed within the storage system, thereby avoiding users' developing index management applications by themselves. Further, the index nodes associated with expired events can be found directly from the various index nodes, thus updating the contents of the storage system with higher efficiency.

Figure 2:
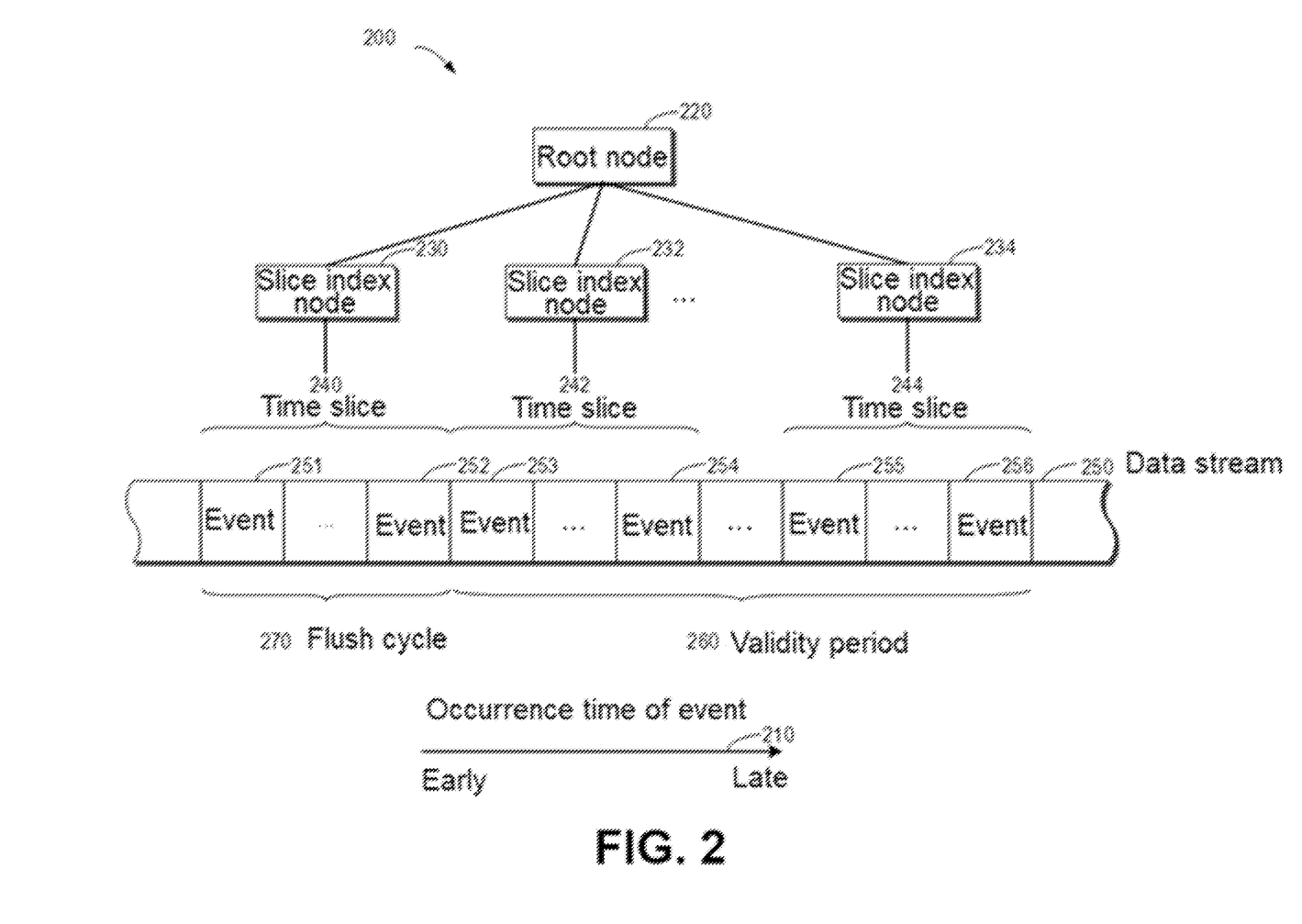
FIG. 2 schematically illustrates a block diagram of a process for managing an index of a storage system according to example implementations of the present disclosure.

Hereinafter, a process according to an example implementation of the present disclosure will be described in general with reference to FIG. 2. FIG. 2 schematically illustrates a block diagram of process 200 for managing an index of a storage system according to example implementations of the present disclosure. Arrow 210 indicates the sequence of occurrence of events, and data stream 250 may include a large number of events 251, . . . , 252, 253, . . . , 254, . . . , 255, . . . , 256, etc. Data stream 250 is continuous, and new events can be continuously generated as time passes. As shown in FIG. 2, the events in the storage system have validity period 260 and flush cycle 270. For example, validity period 260 may be specified as 7 days (or another length of time), and flush cycle 270 may be specified as 1 day (or another length of time). At this time, the events of the last 7 days stored in the storage system are valid. For example, the expired events 7 days ago can be flushed from the storage system at 0:00 every day (or other time points).

According to an example implementation of the present disclosure, a time slice can be determined according to flush cycle 270, and separate slice index nodes can be created for events that occur within that time slice. For example, events 251, . . . , and 252 occur on day X, and in this case, time slice 240 includes the 24 hours of day X. Separate slice index nodes 230 can be created for events 251, . . . , and 252. Similarly, time slice 242 includes the 24 hours of day X+1, and separate slice index nodes 232 can be created for events 253, . . . , and 254. By analogy, time slice 244 includes the 24 hours of day X+7, and separate slice index nodes 234 can be created for events 255, . . . , and 254. The created slice index nodes can be added to root node 220 of the index, and in this case, the events in the storage system can be traversed based on child nodes of the root node.

Each slice index node involves events that occurs within 1 day, and thus when flushing expired events, flushing operations can be performed in a unit of slice index nodes. Specifically, at 0:00 on day X+7, events that occur on day X become expired events. Then, slice index node 230 that points to the expired events can be found via root node 220, and then all the expired events can be deleted from the storage system. With the example implementations of the present disclosure, instead of traversing all index nodes in an index to find expired events, it is possible to determine, directly based on the time slice corresponding to each slice index node, whether multiple events pointed to by that slice index node are expired. If the result of determination is "Yes," all events pointed to by that slice index node can be removed from the storage system directly. In this manner, the index of the storage system can be managed with higher efficiency, thus simplifying the process of updating the storage system.

Figure 3:
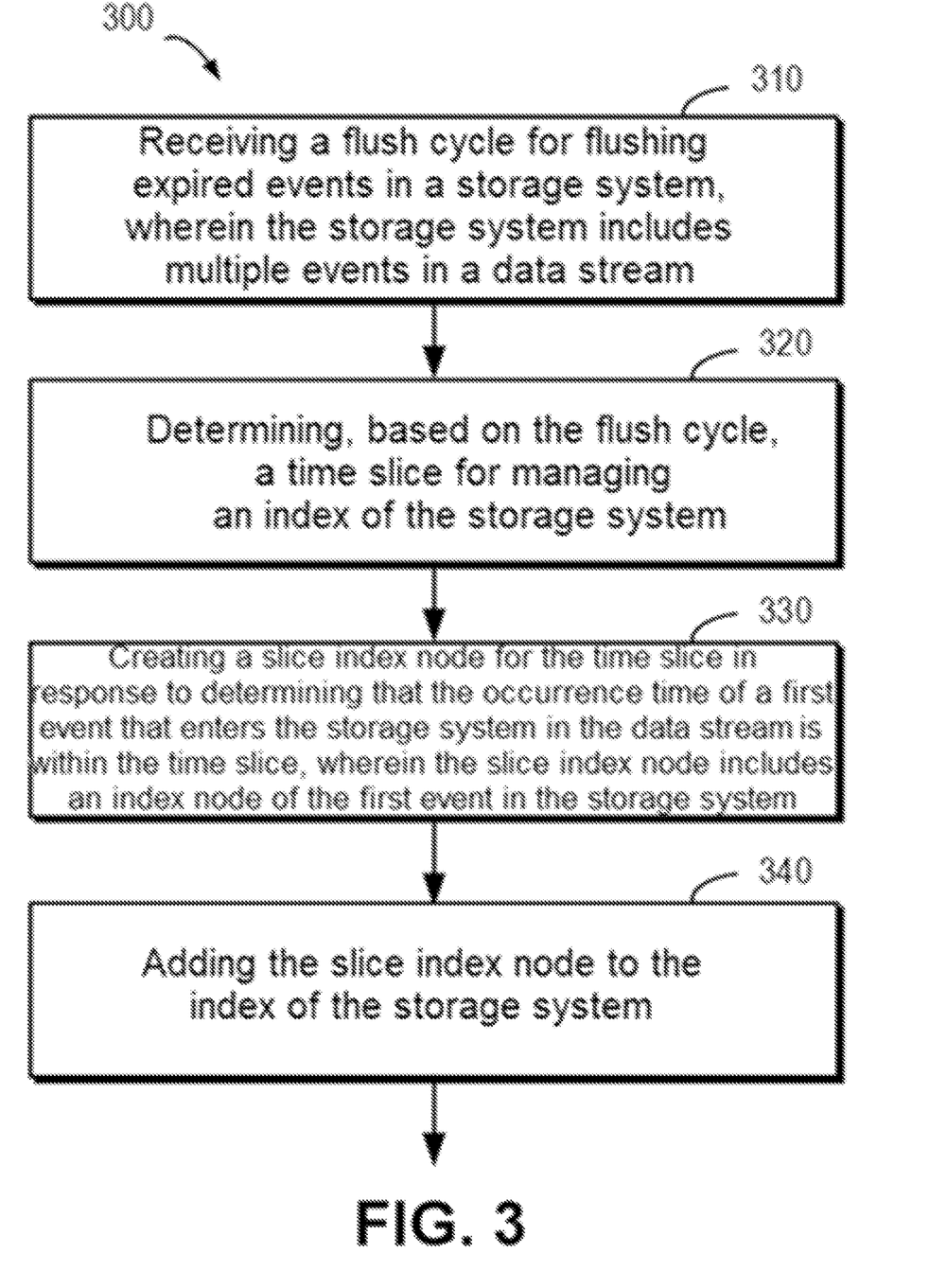
FIG. 3 schematically illustrates a flow chart of a method for managing an index of a storage system according to example implementations of the present disclosure.

Hereinafter, more details of an example implementation according to the present disclosure will be described with reference to FIG. 3. FIG. 3 schematically illustrates a flow chart of method 300 for managing an index of a storage system according to example implementations of the present disclosure. Method 300 may be implemented at a computing resource in storage system 100. At this point, users of storage system 100 do not need to develop index management applications by themselves, but can directly use index management services provided within storage system 100. At block 310 of FIG. 3, a flush cycle for flushing expired events in storage system 100 is received, wherein storage system 100 includes multiple events in a data stream.

As time passes, a large number of events continuously enter storage system 100. Generally speaking, in application environments such as surveillance, only recent events (e.g., those that occurred within the last week) are of concern, not events that occurred much earlier. Therefore, storage system 100 is to be updated periodically. A validity period can be set for events in storage system 100, and expired events can be periodically removed from storage system 100 in accordance with a flush cycle.

It will be understood that an event may involve an occurrence time and a reception time. The occurrence time refers to the time at which the event occurs, for example, the time at which a certain log is generated. The reception time refers to the time at which the event is received by storage system 100, i.e., the time at which the event enters storage system 100. Due to potential delays in data transmission, the reception time will be later than the occurrence time, and there may be large delays in the event of, for example, network failures. An expired event refers to an event of which the occurrence time does not match the validity period of storage system 100. For example, in the case where the validity period is 7 days, an event that occurs 7 days ago is an expired event.

At block 320, a time slice for managing the index of the storage system is determined based on the flush cycle. Here, the time slice refers to a length of time corresponding to the created slice index node. For example, if the flush cycle is 1 day, the time slice can be set to a length of 1 day. Then, the time slice may include 0:00 to 24:00 in a day.

At block 330, if it is determined that the occurrence time of a first event (for example, event 251 shown in FIG. 2) that enters storage system 100 in the data stream is within time slice 240, slice index node 230 is created for time slice 240. Here, slice index node 230 includes an index node of the first event in the storage system. According to an example implementation of the present disclosure, an index node can be created for the first event based on a variety of approaches that are currently known and/or will be developed in the future. Assuming that the current time point is 0:00 on day X, a slice index node can be created for the time slice in which day X is located. If it is determined that the first event occurred between 0:00 and 24:00 on day X, an index node (e.g., a leaf node pointing to a storage address of the event in the storage system) can be created for that first event, and the created index node can be added to slice index node 230.

According to an example implementation of the present disclosure, an index can be created for a subsequent event that occurs within time slice 240. Specifically, if it is determined that the occurrence time of a second event that enters storage system 100 in the data stream is within time slice 240, an index node can be created for the second event, and the created index node can be added to slice index node 230.

Figure 4:
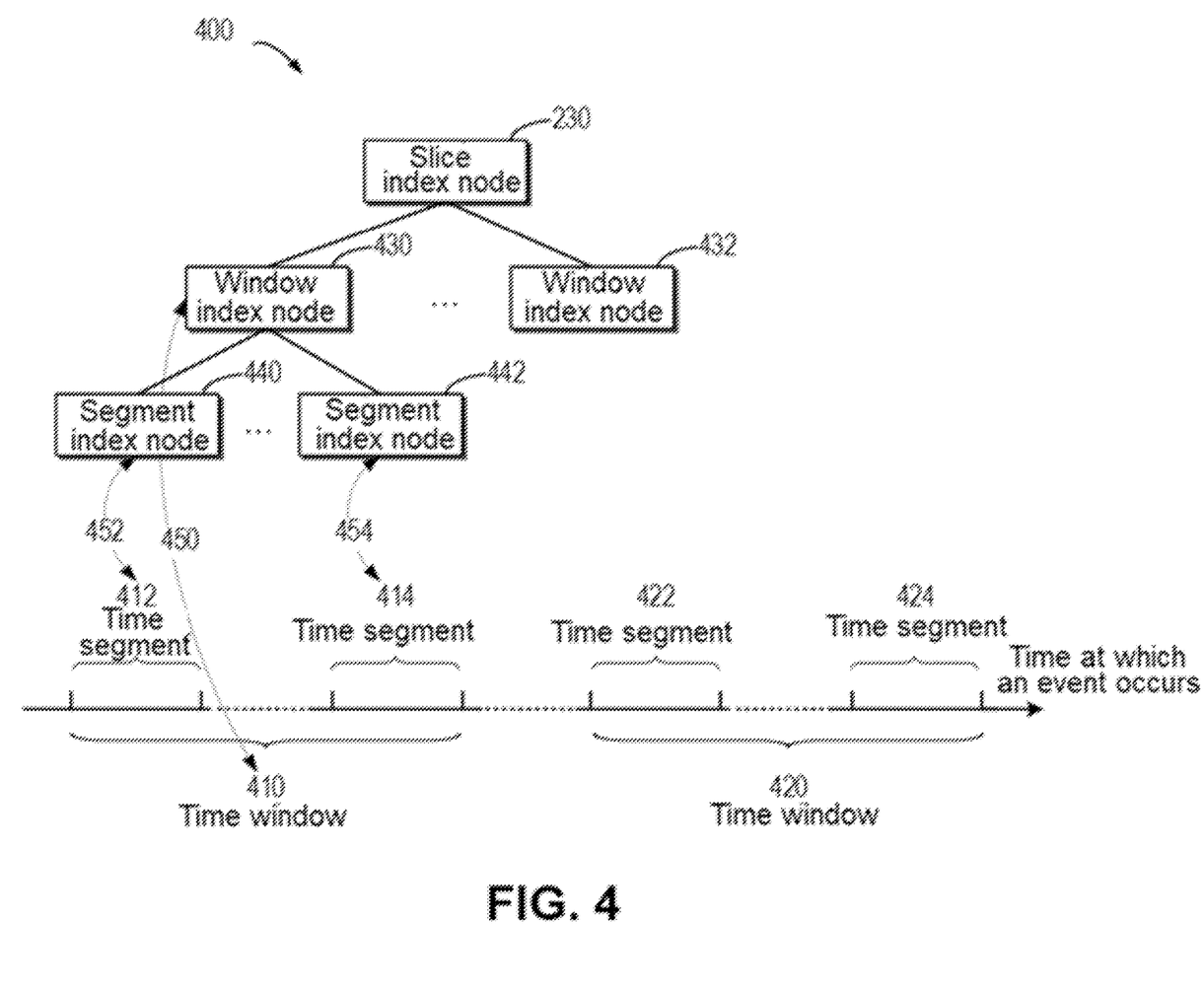
FIG. 4 schematically illustrates a block diagram of a slice index node according to example implementations of the present disclosure.

According to an example implementation of the present disclosure, slice index node 230 may include multiple levels. Hereinafter, more details about slice index node 230 will be described with reference to FIG. 4. FIG. 4 schematically illustrates block diagram 400 of slice index node 230 according to example implementations of the present disclosure. As shown in FIG. 4, time slice 240 can be divided into multiple time windows according to a predetermined length of a time window. If the length of each time window is specified as 1 hour, time slice 240 can be divided into 24 time windows (e.g., time windows 410, . . . , and 420 in FIG. 4). A corresponding window index node can be created for each time window, respectively.

According to an example implementation of the present disclosure, if it is determined that the occurrence time of the first event is within time window 410 among the multiple time windows, window index node 430 can be created for time window 410 based on the first event. An index node can be created for each event that occurs within time window 410, and the created index node can be added to window index node 430. In this case, window index node 430 may include an index node that points to an address of each event in the storage system. Window index node 430 can be added to slice index node 230 for time slice 240 to which time window 410 belongs.

According to an example implementation of the present disclosure, each time window can also be divided at a finer granularity. For example, in accordance with a predetermined length of time, time window 410 can be divided into time segment 412, . . . , and time segment 414, and time window 420 can be divided into time segment 422, . . . , and time segment 424. For example, time window 410 of a length of 1 hour can be divided into 60 time segments, and then each time segment has a length of 1 minute. A corresponding segment index node can be created for each time segment. For example, segment index node 440 can be created for time segment 412, . . . , and segment index node 442 can be created for time segment 414.

Slice index node 230 may have a multi-level structure. As shown in FIG. 4, slice index node 230 may include window index nodes 430, . . . , and 432. As indicated by arrow 450, window index node 430 may correspond to time window 410. Further, window index node 430 may include segment index nodes 440, . . . , and 442. As indicated by arrow 452, segment index node 440 may correspond to time segment 412, and segment index node 442 may correspond to time segment 414. Although not shown in FIG. 4, segment index node 440 may further include index nodes of multiple events that occur within time segment 412, and each leaf node may point to an address of an event in the storage system.

According to an example implementation of the present disclosure, each index node may have a corresponding time range. For example, the time range of slice index node 230 may include 0:00 to 24:00 on day X, the time range of window index node 430 may include 0:00 to 1:00 on day X, the time range of window index node 432 may include 23:00 to 24:00 on day X, the time range of segment index node 440 may include 0:00 to 0:01 on day X, and the time range of segment index node 442 may include 0:59 to 1:00 on day X. In this manner, events that occur at different time points can be managed at a fine temporal granularity.

According to an example implementation of the present disclosure, an index node can be created when the current time enters the time range corresponding to the index node, and the created index node can be added to an index node at an upper level. According to an example implementation of the present disclosure, the index node can be set to a read-only state when the current time has exceeded the time range corresponding to the index node. It will be understood that the time at which an event enters the storage system is later than the occurrence time of the event, and thus the index node can be set to a read-only state when the current time has exceeded the above time range by a predetermined length of time. In this manner, it can be ensured that an index of a late event is added to a correct index node corresponding to the occurrence time.

The process of creating a slice index node has already been described, and hereinafter, the description will return to FIG. 3 to describe more details about creating an index. At block 340 of FIG. 3, slice index node 230 is added to the index of storage system 100. In this manner, expired events in storage system 100 can be updated in a unit of time slices.

Figure 5:
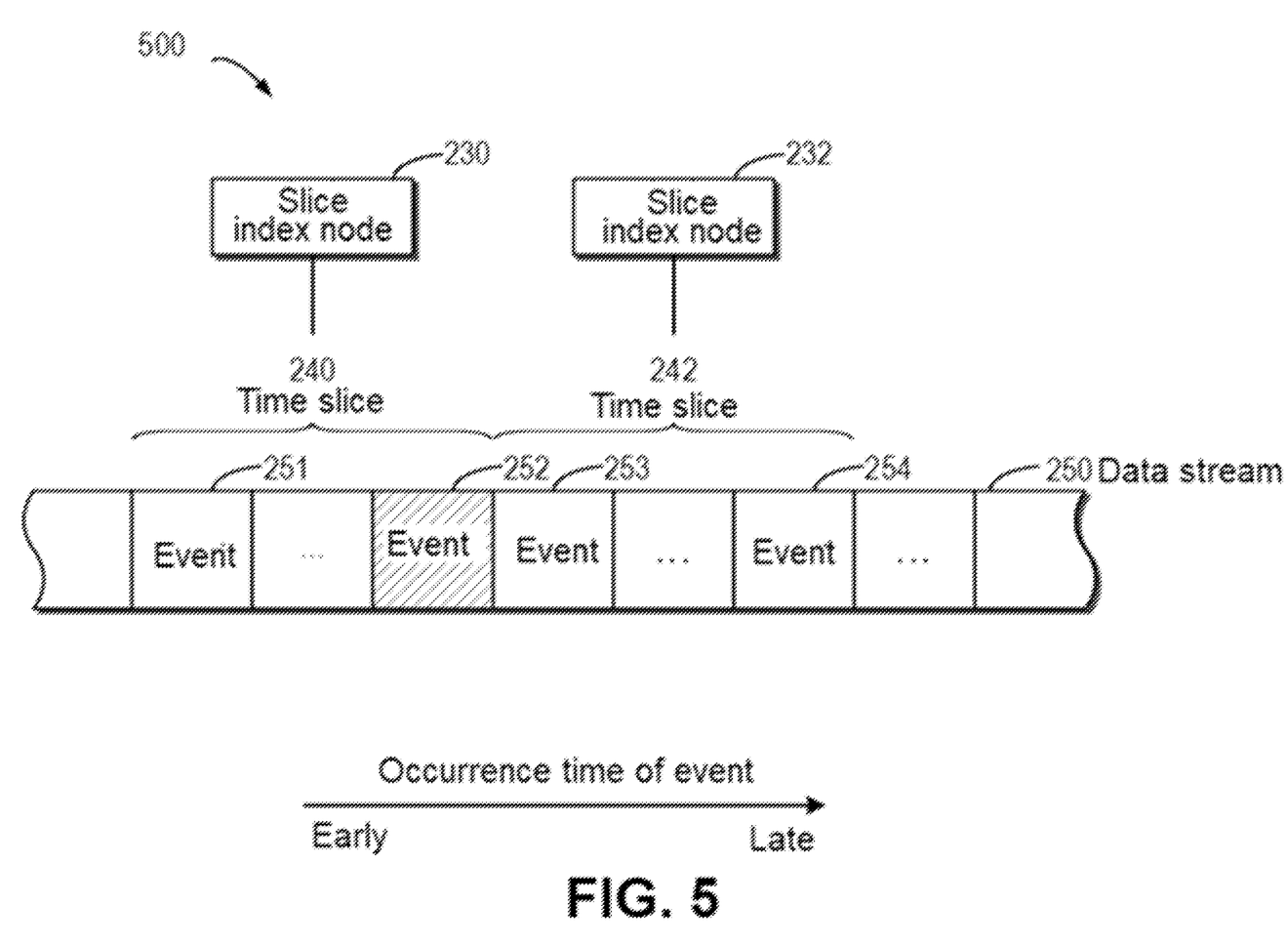
FIG. 5 schematically illustrates a block diagram of a process for creating multiple slice index nodes based on multiple time slices according to example implementations of the present disclosure.

Newly created slice index nodes can be added to the index of the storage system continuously as time passes. According to an example implementation of the present disclosure, if it is determined that the current time exceeds time slice 240, another time slice 242 for managing the index of storage system 100 can be determined based on the current time and the flush cycle. Hereinafter, operations related to multiple time slices will be described with reference to FIG. 5. FIG. 5 schematically illustrates a block diagram of process 500 for creating multiple slice index nodes based on multiple time slices according to example implementations of the present disclosure. As shown in FIG. 5, assuming that the current time has exceeded time slice 240 (that is, 24:00 on day X has elapsed), time slice 242 (i.e., 0:00 to 24:00 on day X+1) can be determined. In this case, time slice 242 is the subsequent time slice immediately adjacent to time slice 240.

Further, slice index node 232 can be created for time slice 242 in the manner described above. At this point, the index of the storage system would include multiple slice index nodes, and each slice index node would correspond to indexes of events that occur within one time slice. Similar to the process described above, corresponding index nodes can be created for events that occur within time slice 242. As time passes, slice index node 232 may include a multi-level index structure.

It will be understood that there is a certain difference between the reception time and the occurrence time of an event entering storage system 100. As shown in FIG. 5, event 252 shown in shading occurs within time slice 240. Due to some reasons such as network failures and/or delays, event 252 may enter storage system 100 within time slice 240 or may enter storage system 100 within next time slice 242. According to an example implementation of the present disclosure, no matter at which time slice the event enters storage system 100, the index node of that event should be added to the slice index node of the time slice to which the event belongs. Specifically, if it is determined that event 252 that enters storage system 100 in data stream 250 occurs within time slice 240, the index of event 252 in storage system 100 can be added to slice index node 230.

According to an example implementation of the present disclosure, when an event that occurs within a new time slice enters storage system 100, a slice index node can be created for that new time slice. Specifically, if the occurrence time of event 253 that enters storage system 100 in the data stream is within time slice 242, slice index node 232 can be created for time slice 242. Further, slice index node 232 can be added to the index, and the index node of event 253 can be added to slice index node 232. With the example implementations of the present disclosure, the index can be managed according to the occurrence time of events, which in turn facilitates the management of storage system 100 according to the time range corresponding to each index node when searching and updating storage system 100.

According to an example implementation of the present disclosure, slice index node 230 can be marked as a read-only state if the current time has reached or exceeded the end time of time slice 240. According to an example implementation of the present disclosure, it is possible to continue to wait for a period of time after entering new time slice 242 to ensure that an index node of a late event is added to a correct slice index node. According to an example implementation of the present disclosure, prior to marking the read-only state, it can be detected whether each event that occurs within time slice 240 has been stored to storage system 100. If the result of determination is yes, slice index node 230 is marked as a read-only state. If the result of determination is no, it is possible to continue to wait for a period of time.

It will be understood that although the above only schematically illustrates the execution of method 300 at a computing resource in storage system 100, method 300 can be executed at multiple computing resources in parallel according to an example implementation of the present disclosure. Specifically, index nodes can be created by multiple threads of one or more computing devices in storage system 100 for a large number of events entering storage system 100. It will be understood that each time slice corresponds to only one slice index node, and index nodes created respectively by the multiple threads can be added to the corresponding slice index nodes.

With the example implementations of the present disclosure, the multiple computing resources can process in parallel a large number of events entering storage system 100. The multiple computing resources can operate independently. For example, index nodes can be created independently for events that occur within time slice 240. Further, the index nodes created by the computing resources can be added to slice index node 230.

Figure 6:
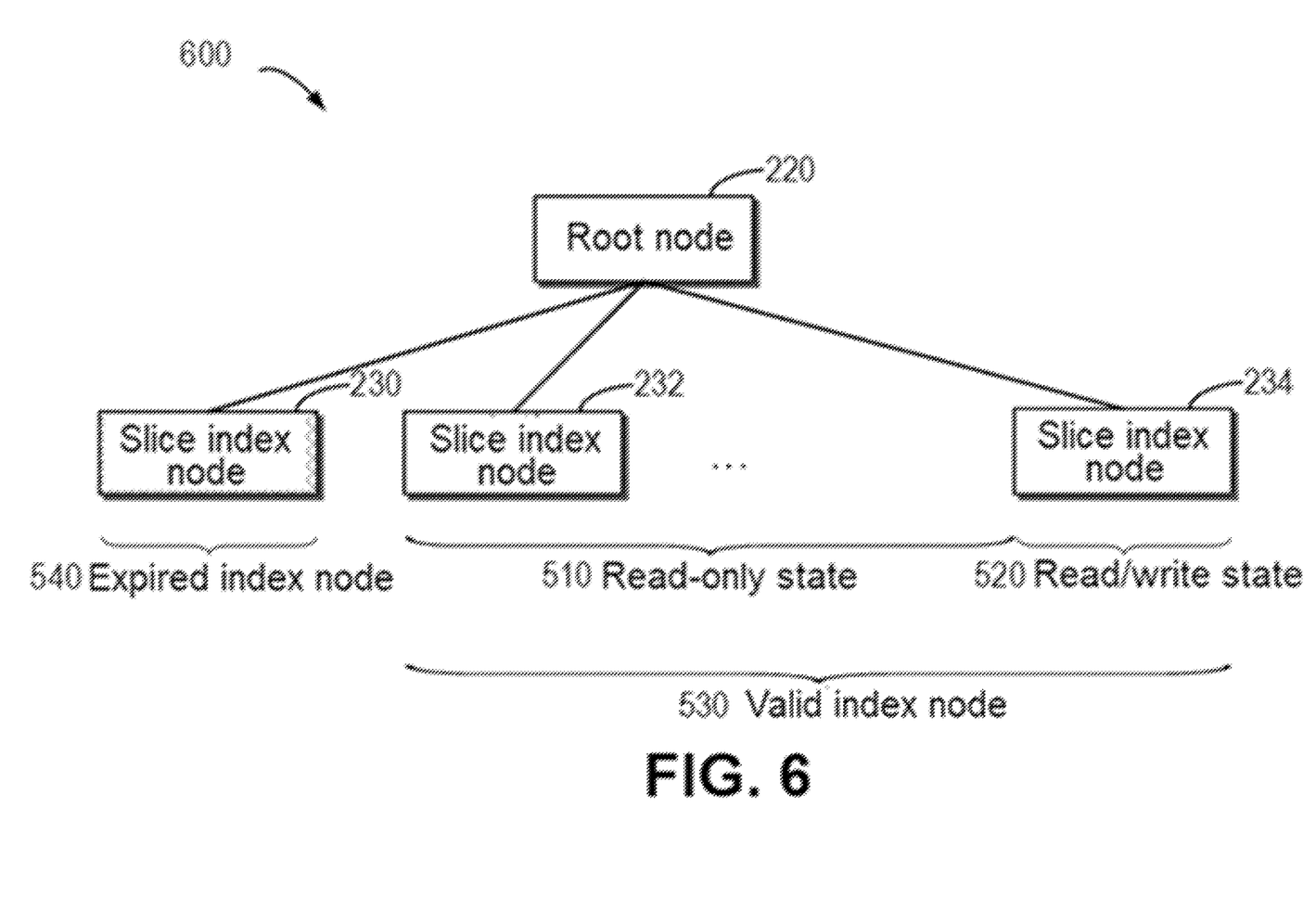
FIG. 6 schematically illustrates a block diagram of the state of various slice index nodes in an index according to example implementations of the present disclosure.

As time passes, new slice index nodes can be continuously added to root node 220 of the index. Hereinafter, more details about the state of nodes in the index will be described with reference to FIG. 6. FIG. 6 schematically illustrates block diagram 600 of the state of various slice index nodes in an index according to example implementations of the present disclosure. Root node 220 includes slice index node 230 (pointing to events that occur on day X), slice index node 232 (pointing to events that occur on day X+1), . . . , and slice index node 234 (pointing to events that occur on day X+7). Assuming that the current time point is day X+7, then at this point, slice index node 230 becomes expired index node 540, and slice index nodes 232, . . . , and 234 are valid index nodes 530. At this point, slice index node 234 is in a read/write state, i.e., it is possible to add indexes of events that occur on day X+7 to the slice index node, and the slice index node can also be read to provide searching services. Slice index node 232, etc., is in read-only state 510 and can only be read but not written in.

According to an example implementation of the present disclosure, searching operations can be performed based on valid index nodes 530 in the index. Specifically, if a searching request for searching for events satisfying a specified time condition in storage system 100 is received, a slice index node corresponding to the specified time condition is searched for in the index. Assuming that the specified time condition is 0:20 on day X+1, slice index node 232 can be found in valid index nodes 530, and the events that satisfy the specified time condition can be acquired in slice index node 232. In the case where slice index node 232 includes a multi-level index structure, index nodes matching the specified time condition can also be found based on the time range of the index nodes at each level, and thus the corresponding events can be found in storage system 100.

Figure 7:
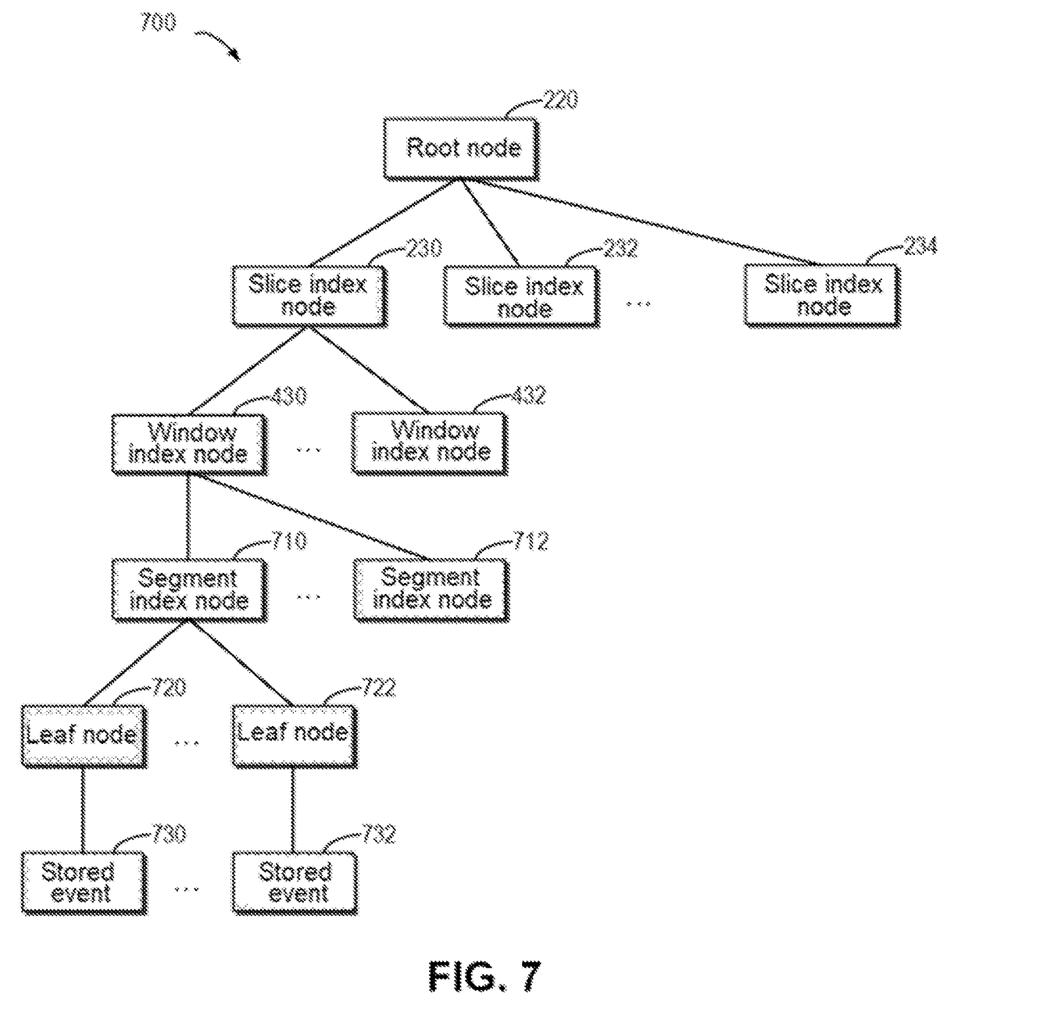
FIG. 7 schematically illustrates a block diagram of a process for removing expired events according to example implementations of the present disclosure.

According to an example implementation of the present disclosure, updates to storage system 100 can be managed based on the various slice index nodes in the index. It is possible to determine slice index nodes in the index that do not satisfy the validity period, and events associated with the found slice index nodes can be removed from storage system 100. Hereinafter, more details related to updating of storage system 100 will be described with reference to FIG. 7. FIG. 7 schematically illustrates a block diagram of process 700 for removing expired events according to example implementations of the present disclosure. Assuming that it is determined that slice index node 230 has expired, all events associated with slice index node 230 can be found in storage system 100, and these events can be deleted.

As shown in FIG. 7, slice index node 230 includes a multi-level index structure, and window index nodes 430, . . . , and 432 each include an index of events that occur within respective hours of day X. All the window index nodes can be traversed one by one. Specifically, window index node 430 includes segment index nodes 710, . . . , and 712. Based on segment index node 710, index nodes of events that occur within that time segment, i.e., leaf nodes 720, . . . , and 722, can be found. Events 730, . . . , and 732 stored in the storage system can be found based on these leaf nodes, and the found events can be deleted. Further, slice index node 230 and its child nodes (as shown in the shaded parts) can be removed from the index. With the example implementations of the present disclosure, it is possible to quickly find events that satisfy the expiration condition based on the index of storage system 100. In this manner, expired data in storage system 100 can be accurately and effectively removed, thereby ensuring that storage system 100 can include sufficient available storage space.

Examples of the method according to the present disclosure have been described in detail above with reference to FIGS. 2 to 7, and implementations of a corresponding apparatus will be described below. According to example implementations of the present disclosure, an apparatus for managing an index of a storage system is provided. The apparatus includes: a receiving module configured to receive a flush cycle for flushing expired events in the storage system, wherein the storage system includes multiple events in a data stream; a determining module configured to determine, based on the flush cycle, a time slice for managing the index of the storage system; a creation module configured to create a slice index node for the time slice in response to determining that the occurrence time of a first event that enters the storage system in the data stream is within the time slice, wherein the slice index node includes an index node of the first event in the storage system; and an adding module configured to add the slice index node to the index of the storage system. According to example implementations of the present disclosure, this apparatus further includes modules for performing other steps in method 300 described above.

Figure 8:
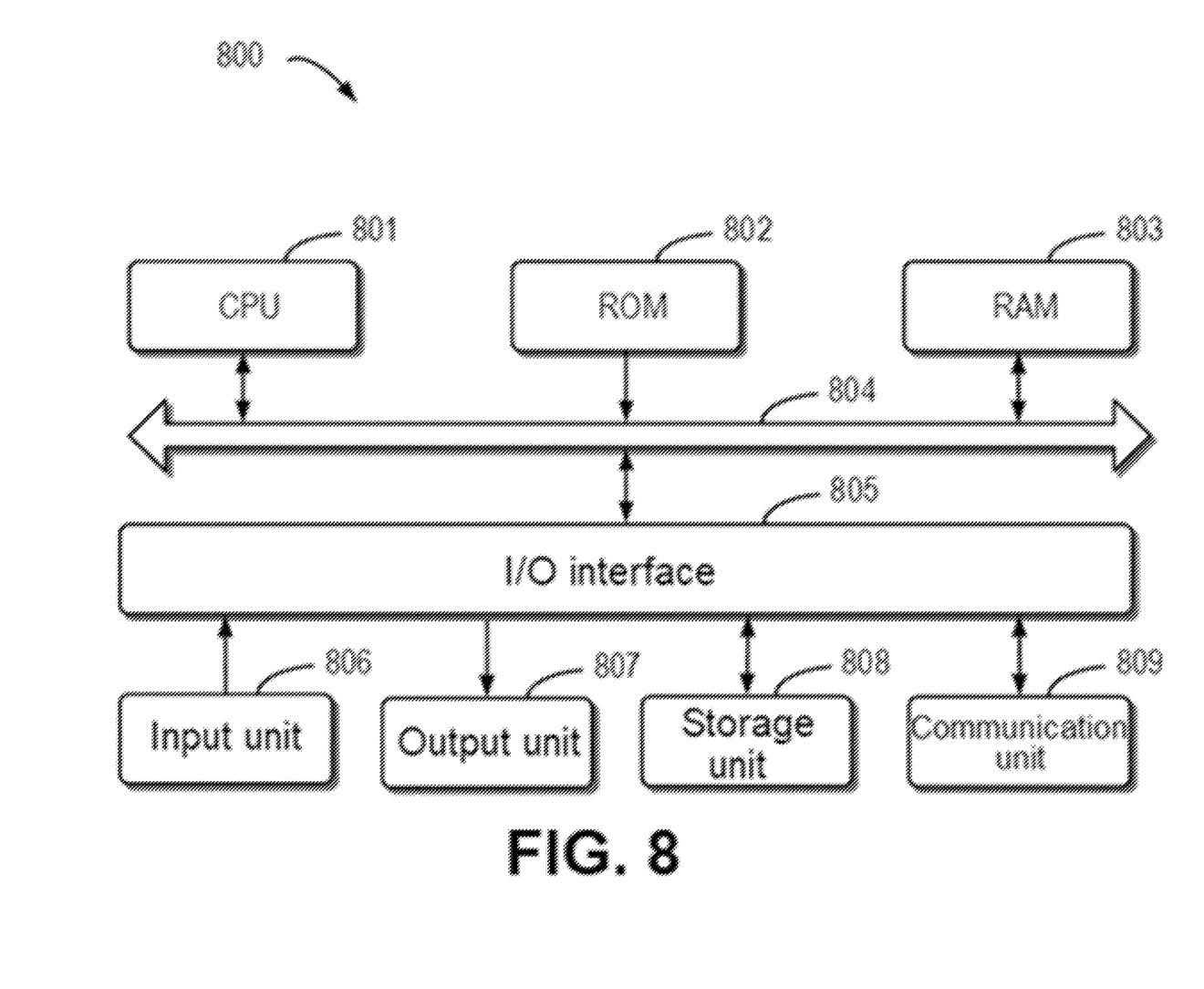
FIG. 8 schematically illustrates a block diagram of a device for managing an index of a storage system according to example implementations of the present disclosure.

FIG. 8 schematically illustrates a block diagram of device 800 for managing an index of a storage system according to example implementations of the present disclosure. As shown in the figure, device 800 includes central processing unit (CPU) 801, which may execute various appropriate actions and processing in accordance with computer program instructions stored in read-only memory (ROM) 802 or computer program instructions loaded from storage unit 808 onto random access memory (RAM) 803. In RAM 803, various programs and data required for the operation of device 800 may also be stored. CPU 801, ROM 802, and RAM 803 are connected to each other through bus 804. Input/output (I/O) interface 805 is also connected to bus 804.

Multiple components in device 800 are connected to I/O interface 805, including: input unit 806, such as a keyboard and a mouse; output unit 807, such as various types of displays and speakers; storage unit 808, such as a magnetic disk and an optical disk; and communication unit 809, such as a network card, a modem, and a wireless communication transceiver. Communication unit 809 allows device 800 to exchange information/data with other devices via a computer network such as the Internet and/or various telecommunication networks.

The various processes and processing described above, such as method 300, may be performed by CPU 801. For example, in some implementations, method 300 may be implemented as a computer software program that is tangibly included in a machine-readable medium, such as storage unit 808. In some implementations, part or all of the computer programs may be loaded and/or installed on device 800 via ROM 802 and/or communication unit 809. When the computer program is loaded into RAM 803 and executed by CPU 801, one or more steps of method 300 described above may be performed. Alternatively, in other implementations, CPU 801 may also be configured in any other suitable manner to implement the above-described process/method.

According to an example implementation of the present disclosure, an electronic device is provided, including: at least one processor; a volatile memory; and a memory coupled to the at least one processor, the memory having instructions stored therein, wherein the instructions, when executed by the at least one processor, cause the device to execute a method for managing an index of a storage system. The method includes: receiving a flush cycle for flushing expired events in the storage system, wherein the storage system includes multiple events in a data stream; determining, based on the flush cycle, a time slice for managing the index of the storage system; creating a slice index node for the time slice in response to determining that the occurrence time of a first event that enters the storage system in the data stream is within the time slice, wherein the slice index node includes an index node of the first event in the storage system; and adding the slice index nodes to the index of the storage system.

According to an example implementation of the present disclosure, creating the slice index nodes includes: dividing the time slice into multiple time windows according to a predetermined length of a time window; creating a window index node for a time window in response to determining that the occurrence time of the first event is within the time window among the multiple time windows, wherein the window index node includes the index node of the first event in the storage system; and adding the window index node to the slice index node.

According to an example implementation of the present disclosure, the method further includes: adding, in response to determining that the occurrence time of a second event that enters the storage system in the data stream is within the time slice, an index node of the second event in the storage system to the slice index node.

According to an example implementation of the present disclosure, the method further includes: determining, in response to determining that the current time exceeds the time slice and based on the current time and the flush cycle, another time slice for managing the index of the storage system, wherein the another time slice is adjacent to the time slice.

According to an example implementation of the present disclosure, the method further includes: creating another slice index node for the another time slice in response to determining that the occurrence time of a third event that enters the storage system in the data stream is within the another time slice, wherein the another slice index node includes an index of the third event in the storage system; and adding the another slice index node to the index.

According to an example implementation of the present disclosure, the method further includes: marking the slice index node as a read-only state.

According to an example implementation of the present disclosure, the method further includes: searching, in response to receiving a searching request for searching for events satisfying a specified time condition in the storage system, the index for a slice index node corresponding to the specified time condition; and acquiring events satisfying the specified time condition based on the slice index node.

According to an example implementation of the present disclosure, the method further includes: receiving a validity period for events in the storage system; removing, in response to determining that the time slice of the slice index node does not satisfy the validity period, events associated with the slice index node from the storage system; and removing the slice index node from the index.

According to an example implementation of the present disclosure, adding an index node of the second event in the storage system to the slice index node includes: creating an index node of the second event in the storage system using a computing resource among multiple computing resources in the storage system; and adding the index node to the slice index node.

According to an example implementation of the present disclosure, a computer program product is provided, which is tangibly stored on a non-transitory computer-readable medium and includes machine-executable instructions, wherein the machine-executable instructions are used to perform the method according to the present disclosure.

According to an example implementation of the present disclosure, a computer-readable medium is provided. The computer-readable medium stores machine-executable instructions that, when executed by at least one processor, cause the at least one processor to implement the method according to the present disclosure.

The present disclosure may be a method, a device, a system, and/or a computer program product. The computer program product may include a computer-readable storage medium on which computer-readable program instructions for performing various aspects of the present disclosure are loaded.

The computer-readable storage medium may be a tangible device capable of retaining and storing instructions used by an instruction-executing device. For example, the computer-readable storage medium may be, but is not limited to, an electrical storage device, a magnetic storage device, an optical storage device, an electromagnetic storage device, a semiconductor storage device, or any suitable combination of the above. More specific examples (a non-exhaustive list) of the computer-readable storage medium include: a portable computer disk, a hard disk, a random access memory (RAM), a read-only memory (ROM), an erasable programmable read-only memory (EPROM or a flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any appropriate combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires.

The computer-readable program instructions described herein can be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from the network and forwards the computer-readable program instructions for storage in a computer-readable storage medium in each computing/processing device.

Computer program instructions for performing the operations of the present disclosure may be assembly instructions, instruction set architecture (ISA) instructions, machine instructions, machine-related instructions, microcode, firmware instructions, state setting data, or source or object code written in any combination of one or more programming languages, wherein the programming languages include object-oriented programming languages such as Smalltalk and C++, and conventional procedural programming languages such as the C language or similar programming languages. The computer-readable program instructions may be executed entirely on a user's computer, partly on a user's computer, as a stand-alone software package, partly on a user's computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some implementations, an electronic circuit, for example, a programmable logic circuit, a field programmable gate array (FPGA), or a programmable logic array (PLA), is personalized by utilizing state information of the computer-readable program instructions, wherein the electronic circuit may execute the computer-readable program instructions so as to implement various aspects of the present disclosure.

Various aspects of the present disclosure are described herein with reference to flow charts and/or block diagrams of the method, the apparatus (system), and the computer program product according to implementations of the present disclosure. It should be understood that each block of the flow charts and/or block diagrams and combinations of blocks in the flow charts and/or block diagrams can be implemented by computer-readable program instructions.

These computer-readable program instructions may be provided to a processing unit of a general-purpose computer, a special-purpose computer, or a further programmable data processing apparatus, thereby producing a machine, such that these instructions, when executed by the processing unit of the computer or the further programmable data processing apparatus, produce means for implementing the functions/actions specified in one or more blocks in the flow charts and/or block diagrams. These computer-readable program instructions may also be stored in a computer-readable storage medium, and these instructions cause a computer, a programmable data processing apparatus, and/or other devices to operate in a specific manner; and thus the computer-readable medium having instructions stored includes an article of manufacture that includes instructions that implement various aspects of the functions/actions specified in one or more blocks in the flow charts and/or block diagrams.

The computer-readable program instructions may also be loaded to a computer, a further programmable data processing apparatus, or a further device, so that a series of operating steps may be performed on the computer, the further programmable data processing apparatus, or the further device to produce a computer-implemented process, such that the instructions executed on the computer, the further programmable data processing apparatus, or the further device may implement the functions/actions specified in one or more blocks in the flow charts and/or block diagrams.

The flow charts and block diagrams in the drawings illustrate the architectures, functions, and operations of possible implementations of the systems, methods, and computer program products according to various implementations of the present disclosure. In this regard, each block in the flow charts or block diagrams may represent a module, a program segment, or part of an instruction, the module, program segment, or part of an instruction including one or more executable instructions for implementing specified logical functions. In some alternative implementations, functions marked in the blocks may also occur in an order different from that marked in the accompanying drawings. For example, two successive blocks may actually be executed in parallel substantially, or they may be executed in an opposite order sometimes, depending on the functions involved. It should be further noted that each block in the block diagrams and/or flow charts as well as a combination of blocks in the block diagrams and/or flow charts may be implemented using a special hardware-based system that executes specified functions or actions, or using a combination of special hardware and computer instructions.

Various implementations of the present disclosure have been described above. The above description is illustrative and not exhaustive, and is not limited to the various implementations disclosed. Numerous modifications and alterations are apparent to persons of ordinary skill in the art without departing from the scope and spirit of the illustrated implementations. The selection of terms as used herein is intended to best explain principles and practical applications of the various implementations or improvements to technologies on the market, or to enable other persons of ordinary skill in the art to understand the implementations disclosed here.

What is claimed is:

1. A method, comprising:
receiving, by a system comprising a processor, a flush cycle for a flushing of expired events in a storage system, wherein the storage system comprises multiple events in a data stream, and wherein the flush cycle comprises a first amount of time that elapses between iterations of performing the flushing of the expired events in the storage system;
determining, based on the first amount of time, a time slice that comprises a second amount of time, wherein a slice index node is configured to store indications of events that occur during the second amount of time within an index of the storage system;
creating the slice index node for the time slice in response to determining that a first occurrence time of a first event of the events that enters the storage system in the data stream corresponds to the second amount of time, wherein the slice index node comprises a first index node of the first event in the storage system;
adding the slice index node to the index of the storage system; and
storing the indications of the events that occur during a time period that corresponds to the second amount of time within the slice index node.

2. The method according to claim 1, wherein creating the slice index node comprises:
dividing the time slice into multiple time windows according to a defined length of a time window;
creating a window index node for the time window in response to determining that the occurrence time of the first event is within one of the multiple time windows, wherein the window index node comprises the first index node of the first event in the storage system; and
adding the window index node to the slice index node.

3. The method according to claim 1, further comprising: adding, in response to determining that a second occurrence time of a second event that enters the storage system in the data stream is within the time slice, a second index node of the second event in the storage system to the slice index node.

4. The method according to claim 3, wherein adding the second index node of the second event in the storage system to the slice index node comprises:
creating the second index node of the second event in the storage system using a computing resource among multiple computing resources in the storage system; and
adding the second index node to the slice index node.

5. The method according to claim 1, further comprising: determining, in response to determining that a current time exceeds the time slice and based on the current time and the flush cycle, another time slice usable to manage the index of the storage system, wherein the other time slice is adjacent to the time slice.

6. The method according to claim 5, further comprising: creating another slice index node for the other time slice in response to determining that a third occurrence time of a third event that enters the storage system in the data stream is within the other time slice, wherein the other slice index node comprises a third index of the third event in the storage system; and
adding the other slice index node to the index.

7. The method according to claim 5, further comprising: marking a state of the slice index node as a read-only state.

8. The method according to claim 1, further comprising: searching, in response to receiving a searching request to search for events satisfying a specified time condition in the storage system, the index for a resulting slice index node corresponding to the specified time condition; and
acquiring the events satisfying the specified time condition based on the resulting slice index node.

9. The method according to claim 1, further comprising: receiving a validity period for events in the storage system;
removing, in response to determining that the time slice of the slice index node does not satisfy the validity period, events associated with the slice index node from the storage system; and
removing the slice index node from the index.

10. A device, comprising:
at least one processor; and
a memory coupled to the at least one processor, the memory having instructions stored therein, wherein the instructions, when executed by the at least one processor, cause the device to execute operations, comprising:
  receiving a flush cycle for flushing expired events in the storage system, wherein a storage system comprises multiple events in a data stream;
  determining, based on the flush cycle, a time slice that comprises an amount of time, wherein a slice index node is configured to store indications of events that occur during a time period indicated by the time slice within an index of the storage system;
  creating the slice index node for the time slice in response to determining that a first occurrence time of a first event of the events that enters the storage system in the data stream is within the time slice, wherein the slice index node comprises a first index node of the first event in the storage system;
  adding the slice index node to the index of the storage system;
  storing the indications of the events that occur during the time period indicated by the time slice within the slice index node.

11. The device according to claim 10, wherein creating the slice index node comprises:
  dividing the time slice into multiple time windows according to a predetermined length of time window;
  creating a window index node for a time window in response to determining that the first occurrence time of the first event is within one of the multiple time windows, wherein the window index node comprises the first index node of the first event in the storage system; and
  adding the window index node to the slice index node.

12. The device according to claim 10, wherein the operations further comprise: adding, in response to determining that a second occurrence time of a second event that enters the storage system in the data stream is within the time slice, a second index node of the second event in the storage system to the slice index node.

13. The device according to claim 12, wherein adding the second index node of the second event in the storage system to the slice index node comprises:
  creating the second index node of the second event in the storage system using a computing resource among multiple computing resources in the storage system; and
  adding the second index node to the slice index node.

14. The device according to claim 10, wherein the operations further comprise: determining, in response to determining that a current time exceeds the time slice and based on the current time and the flush cycle, another time slice for managing the index of the storage system, wherein the other time slice is adjacent to the time slice.

15. The device according to claim 14, wherein the operations further comprise:
  creating another slice index node for the other time slice in response to determining that a third occurrence time of a third event that enters the storage system in the data stream is within the other time slice, wherein the other slice index node comprises an associated index of the third event in the storage system; and
  adding the other slice index node to the index.

16. The device according to claim 14, wherein the operations further comprise: marking the slice index node with a read-only state.

17. The device according to claim 10, wherein the operations further comprise:
  searching, in response to receiving a searching request for searching for events satisfying a specified time condition in the storage system, the index for an associated slice index node corresponding to the specified time condition; and
  acquiring events satisfying the specified time condition based on the associated slice index node.

18. The device according to claim 10, wherein the operations further comprise:
  receiving a validity period for events in the storage system;
  removing, in response to determining that the time slice of the slice index node does not satisfy the validity period, events associated with the slice index node from the storage system; and
  removing the slice index node from the index.

19. A computer program product that is stored on a non-transitory computer-readable medium and comprises machine-executable instructions, wherein the machine-executable instructions are used to perform operations, comprising:
  receiving a flush cycle applicable to flushing expired events in a storage system, wherein the storage system comprises multiple events in a data stream;
  determining, based on the flush cycle, a time slice that comprises an amount of time, wherein a slice index node is configured to store indications of events that occur during a range of time that corresponds to the time slice within an index of the storage system;
  creating the slice index node for the time slice in response to determining that an occurrence time of a first event of the events that enters the storage system in the data stream is within the time slice, wherein the slice index node comprises an index node of the first event in the storage system;
  adding the slice index node to the index of the storage system;
  storing the indications of the events that occur during the time range that corresponds to the time slice within the slice index node.

20. The computer program product according to claim 19, wherein creating the slice index node comprises:
  dividing the time slice into time windows according to a defined time window length;
  creating a window index node for a time window in response to determining that an occurrence time of the first event is within one of the time windows, wherein the window index node comprises the index node of the first event in the storage system; and
  adding the window index node to the slice index node.

* * * * *